(12) United States Patent
Shibata et al.

(10) Patent No.: US 11,836,959 B2
(45) Date of Patent: Dec. 5, 2023

(54) INFORMATION PRESENTATION SYSTEM, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventors: Masanori Shibata, Tokyo (JP); Daisuke Kobayashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 17/464,302

(22) Filed: Sep. 1, 2021

(65) Prior Publication Data

US 2022/0076013 A1 Mar. 10, 2022

(30) Foreign Application Priority Data

Sep. 10, 2020 (JP) .................................. 2020-152292

(51) Int. Cl.
| G06V 10/25 | (2022.01) |
| G06V 40/16 | (2022.01) |
| G06V 40/18 | (2022.01) |
| G06V 40/20 | (2022.01) |

(52) U.S. Cl.
CPC .......... *G06V 10/25* (2022.01); *G06F 2218/08* (2023.01)

(58) Field of Classification Search
None
See application file for complete search history.

(56) References Cited

U.S. PATENT DOCUMENTS

| 6,438,594 B1* | 8/2002 | Bowman-Amuah ....................... G06F 9/4488 709/225 |
| 2008/0004904 A1* | 1/2008 | Tran ........................ A61B 5/411 340/286.07 |
| 2010/0257195 A1* | 10/2010 | Inoue ................... G06F 16/9535 707/769 |
| 2013/0151240 A1* | 6/2013 | Myslinski ............... G06F 40/00 704/9 |

(Continued)

FOREIGN PATENT DOCUMENTS

| JP | 2010-263639 A | 11/2010 |
| JP | 2014-116891 A | 6/2014 |
| JP | 2016-133701 A | 7/2016 |

*Primary Examiner* — Soo Shin
(74) *Attorney, Agent, or Firm* — Canon U.S.A., Inc., IP Division

(57) ABSTRACT

An information presentation system comprising an obtainment unit obtaining a feature of an object, a specification unit specifying the object from the feature, a display, a storage storing specification information and a communication unit communicating with an external server and obtaining related information of the object is provided. The specification unit specifies the object by searching for the specification information. The specification information includes a plurality of pieces of feature information observation targets and a plurality of pieces of object information which are associated with the plurality of pieces of feature information and related to the observation targets. The display displays the related information. In a case in which the specification unit has specified the object and there is a difference between the related information and the object information, the object information is updated based on the related information.

16 Claims, 7 Drawing Sheets

(56) References Cited

U.S. PATENT DOCUMENTS

| | | | | |
|---|---|---|---|---|
| 2014/0278220 | A1* | 9/2014 | Yuen | A61B 5/681 |
| | | | | 702/150 |
| 2016/0255139 | A1* | 9/2016 | Rathod | H04N 1/32101 |
| | | | | 709/203 |
| 2017/0312614 | A1* | 11/2017 | Tran | G06F 3/00 |
| 2018/0053284 | A1* | 2/2018 | Rodriguez | G06F 1/3203 |
| 2020/0090375 | A1* | 3/2020 | Mori | G02B 27/01 |
| 2021/0120206 | A1* | 4/2021 | Liu | G06F 16/90332 |
| 2022/0076013 | A1* | 3/2022 | Shibata | G06V 40/168 |

* cited by examiner

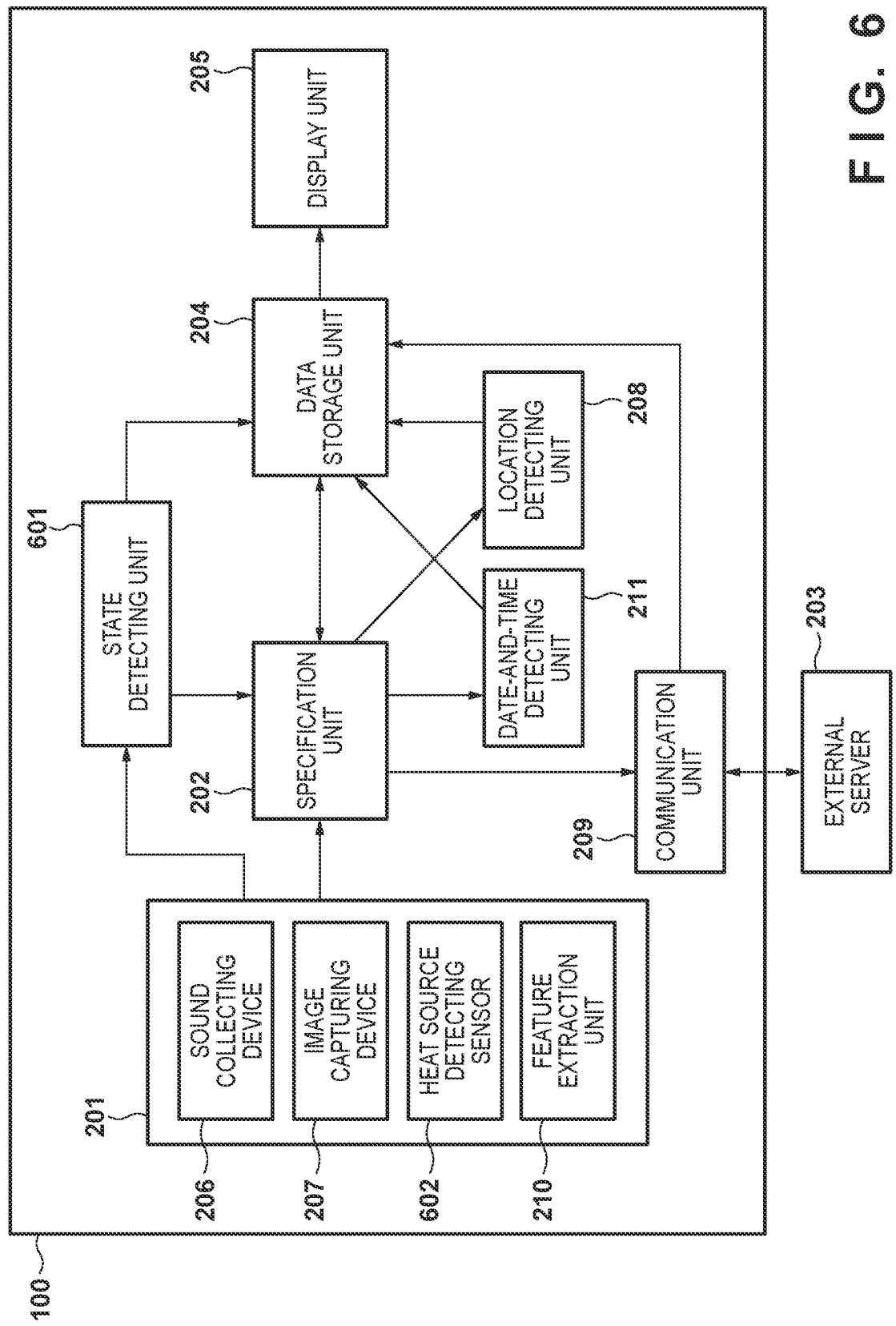

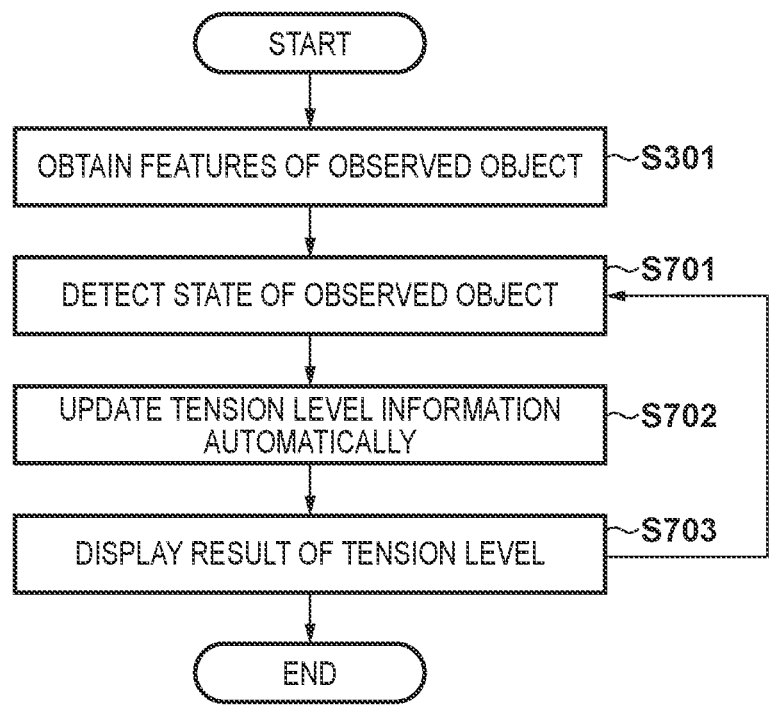
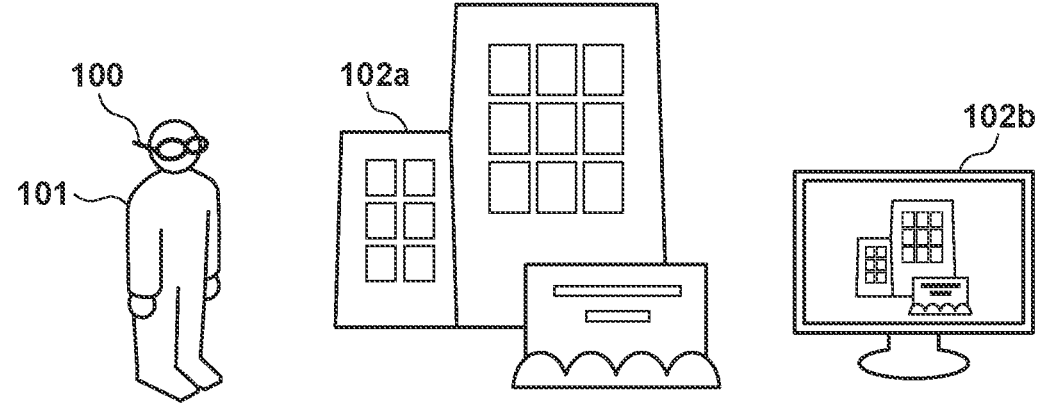

INFORMATION PRESENTATION SYSTEM, CONTROL METHOD THEREOF, AND NON-TRANSITORY COMPUTER-READABLE STORAGE MEDIUM

BACKGROUND

Field

The present disclosure relates to an information presentation system, a control method thereof, and a program.

Description of the Related Art

Japanese Patent Laid-Open No. 2010-263639 discloses an image capturing device that specifies an object extracted from obtained image information and causes a display unit to present personal information of a specified object.

In the image capturing device disclosed in Japanese Patent Laid-Open No. 2010-263639, since pieces of personal information such as a personal name, a personal telephone number, a personal email address, a personal facial image, and the like of the specified object to be displayed on the display unit are not updated unless they are updated by a user, these pieces of personal information may be old information.

SUMMARY

Some embodiments of the present disclosure provide a technique advantageous in improving the accuracy of information related to an observed object in an information presentation system.

According to some embodiments, an information presentation system comprising an obtainment unit configured to obtain a feature of an observed object, a specification unit configured to specify the observed object from the feature of the observed object obtained by the obtainment unit, a display unit configured to display information of the observed object specified by the specification unit, and a data storage unit configured to store specification information used by the specification unit to specify the observed object, wherein the specification unit specifies the observed object by searching for the specification information based on the feature of the observed object, the specification information includes a plurality of pieces of feature information storing respective features of a plurality of observation targets and a plurality of pieces of observation object information which are associated with the plurality of pieces of feature information and store information related to the plurality of observation targets which are used the specification unit to execute a search based on the feature of the observed object, the information presentation system further includes a communication unit configured to communicate with a server arranged outside the information presentation system to obtain related information of the observed object specified by the specification unit, the information displayed by the display unit includes the related information, and in a case in which the specification unit has specified the observed object and there is a difference between the related information and the observation object information of the observed object specified, among the plurality of pieces of observation object information, by the specification unit, the observation object information of the observed object specified, among the plurality of pieces of observation object information, by the specification unit is updated based on the related information, is provided.

According to some other embodiments, a control method of an information presentation system, comprising: obtaining a feature of an observed object; specifying the observed object from the obtained feature of the observed object; causing a display unit to display information of the specified observed object; and communicating with a server arranged outside the information presentation system and obtaining related information of the specified observed object, wherein the information displayed by the display unit includes the related information, the specifying includes searching for, based on the feature of the observed object, specification information which is used to specify the observed object and is stored in a data storage unit, and the specification information includes a plurality of pieces of feature information which store respective features of a plurality of observation targets and a plurality of pieces of observation object information which are associated with the plurality of pieces of feature information and store information related to the plurality of observation targets which are used the specification unit to execute a search based on the feature of the observed object, and in a case in which the observed object has been specified and there is a difference between the related information and the observation object information of the specified observed object among the plurality of pieces of observation object information, updating, based on the related information, the observation object information of the specified observed object among the plurality of pieces of observation object information, is provided.

According to still other embodiments, a non-transitory computer-readable storage medium storing a program for causing a computer to execute a control method of an information presentation system, comprising: obtaining a feature of an observed object; specifying the observed object from the obtained feature of the observed object; causing a display unit to display information of the specified observed object; and communicating with a server arranged outside the information presentation system and obtaining related information of the specified observed object, wherein the information displayed by the display unit includes the related information, the specifying includes searching for, based on the feature of the observed object, specification information which is used to specify the observed object and is stored in a data storage unit, and the specification information includes a plurality of pieces of feature information which store respective features of a plurality of observation targets and a plurality of pieces of observation object information which are associated with the plurality of pieces of feature information and store information related to the plurality of observation targets which are used the specification unit to execute a search based on the feature of the observed object, and in a case in which the observed object has been specified and there is a difference between the related information and the observation object information of the specified observed object among the plurality of pieces of observation object information, updating, based on the related information, the observation object information of the specified observed object among the plurality of pieces of observation object information, is provided.

Further features of the present disclosure will become apparent from the following description of exemplary embodiments (with reference to the attached drawings).

BRIEF DESCRIPTION OF THE DRAWINGS

FIG. 6 is a block diagram showing yet another example of the arrangement of the information presentation system according to the embodiment;

FIG. 7 is a flowchart showing the procedure of the signal processing of the information presentation system of FIG. 6; and FIG. 8 is a view showing another example of the use of the information presentation system according to the embodiment.

DESCRIPTION OF THE EMBODIMENTS

Figure 1:
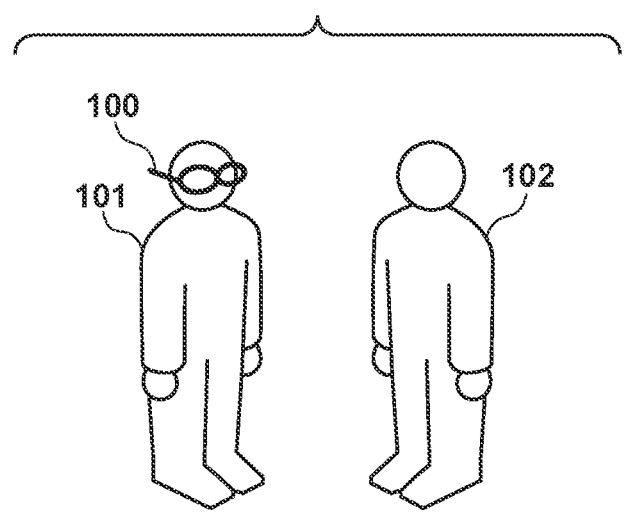
FIG. 1 is a view showing an example of the use of an information presentation system according to an embodiment.

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

An information presentation system according to an embodiment of the present disclosure will be described with reference to FIGS. 1 to 8. FIG. 1 is a view showing a state of an information presentation system 100 according to the embodiment in use. A user 101 who uses the information presentation system 100 is facing an observed object 102 who is an observation target of the information presentation system 100. Although a human (person) is the observation target here, the present disclosure is not limited to this. An observation target may be a building structure such as a building, a train station, or the like, an animal, natural scenery, or the like. An example in which an object other than a person is set as an observation target will be described later.

As in the arrangement shown in FIG. 1, the information presentation system 100 may be, for example, a so-called wearable device represented by smart glasses or the like. In addition, at least a part of the information presentation system 100 may be incorporated in the wearable device.

Figure 2:
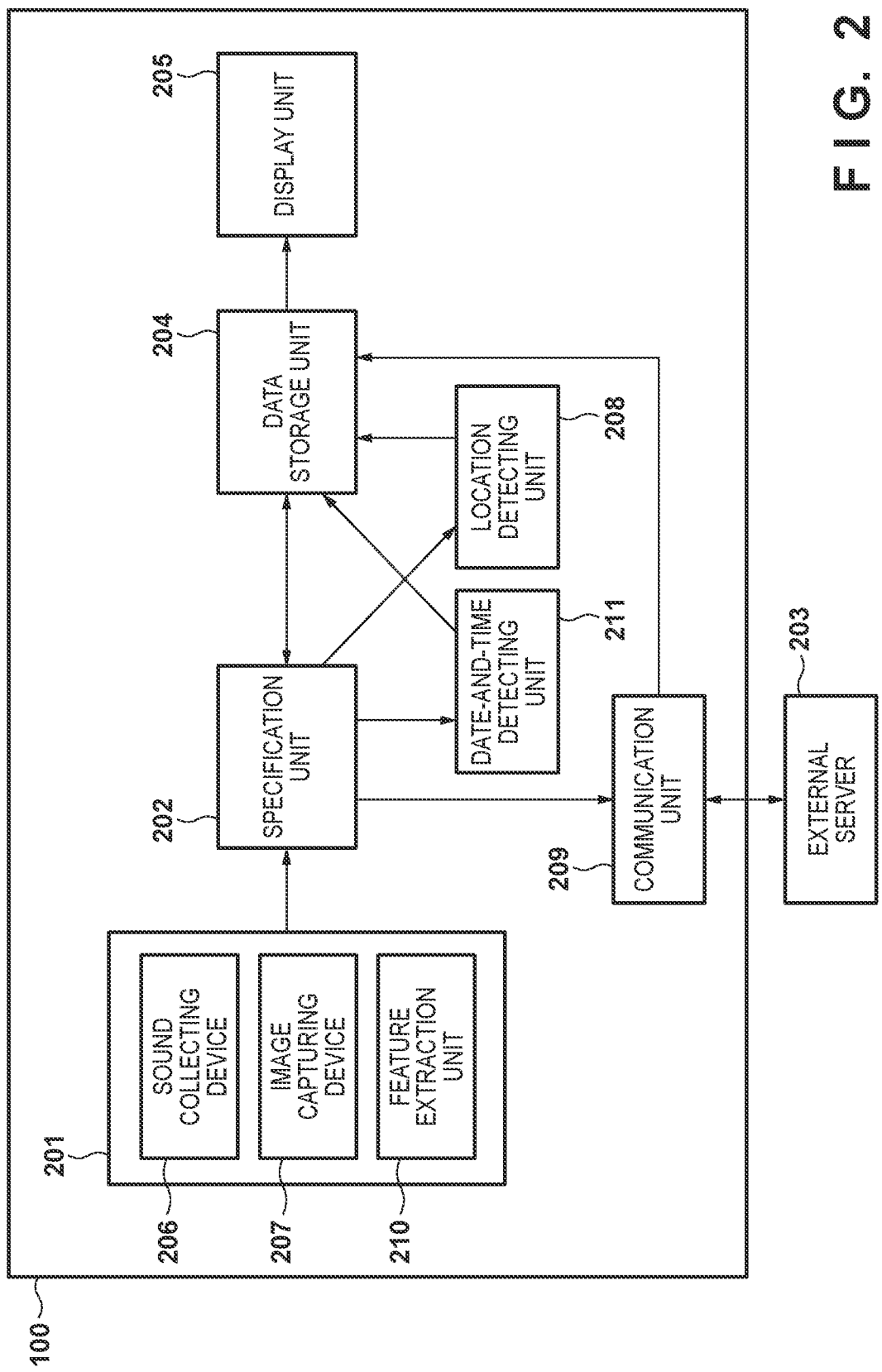
FIG. 2 is a block diagram showing an example of the arrangement of the information presentation system according to the embodiment.

FIG. 2 is a block diagram showing an example of the arrangement of the information presentation system 100 according to this embodiment. The information presentation system 100 includes an obtainment unit 201 which obtains features of the observed object 102, a specification unit 202 which specifies the observed object from the features of the observed object 102 obtained by the obtainment unit 201, and a display unit 205 which displays information of the observed object specified by the specification unit 202. In addition, the information presentation system 100 includes a communication unit 209 for communicating with a server 203, arranged outside the information presentation system 100, to obtain information related to the observed object 102 specified by the specification unit 202. The information presentation system also includes a data storage unit 204 that stores specification information used by the specification unit 202 for specifying the observed object 102. The information presentation system 100 may also include, as in the arrangement shown in FIG. 2, a date-and-time detecting unit 211 for obtaining information of the date and time when the observed object 102 is observed, and a location detecting unit 208 for obtaining information of the location where the observed object 102 is observed. The date- and time-detecting unit 211 can be, for example, a clock. The location detecting unit 208 can be, for example, a GPS (Global Positioning System) reception device or the like. The location detecting unit 208 may also function as the date-and-time detecting unit 211 by obtaining not only the location but also the time information from the GPS or the like.

The obtainment unit 201 can include a sound collecting device 206 for obtaining the features of the observed object 102. For example, a microphone or the like can be used as the sound collecting device 206. The obtainment unit 201 can also include an image capturing device 207 for obtaining the features of the observed object 102. For example, a camera, a video camera, or the like can be used the image capturing device 207. The obtainment unit 201 may include both the sound collecting device 206 and the image capturing device 207 or may include only one of these devices. The obtainment unit 201 can also include a feature extraction unit 210 that includes a circuit such as a processor or the like for extracting the features of the observed object 102 from an image captured by the image capturing device 207 or a sound collected by the sound collecting device. The sound collecting device 206 and the image capturing device 207 of the obtainment unit 201 may be incorporated in, for example, a wearable device such as the smart glasses described above. In a case in which the sound collecting device 206 and the image capturing device 207 of the information presentation system 100 are incorporated in a pair of smart glasses as shown in FIG. 1, it will increase the possibility that these devices will capture the features of the observed object 102 as an observation target present in a line-of-sight direction of the user 101.

Figure 3:
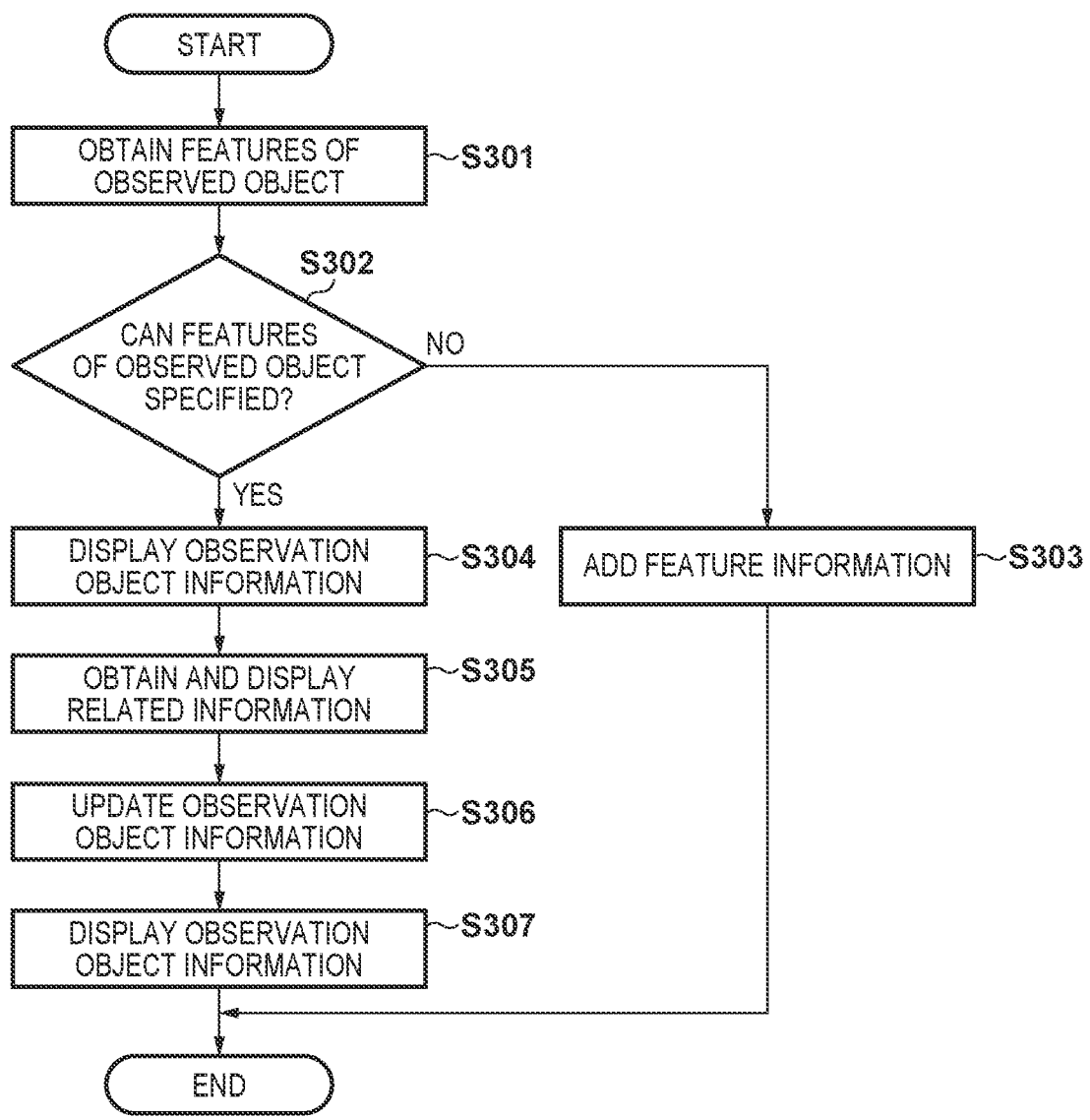
FIG. 3 is a flowchart showing the procedure of signal processing of the information presentation system according to the embodiment.

FIG. 3 is a flowchart showing the procedure of signal processing of the information presentation system 100 according to this embodiment. First, in step S301, the obtainment unit 201 will obtain features of the observed object 102. The features of the observed object 102 are, for example, features extracted by the feature extraction unit 210 from facial features and features of the entire body of the observed object 102 captured by the image capturing device 207 and features of the voice of the observed object 102 collected by the sound collecting device 206. When the obtainment unit 201 has obtained the features of the observed object 102, the information presentation system 100 shifts to the process of step S302.

In step S302, the specification unit 202 specifies the observed object 102 from the features of the observed object 102 obtained by the obtainment unit 201. More specifically, the specification unit 202 will specify, based on the features of the observed object 102, the observed object 102 by searching for specification information which can be used to specify the observed object 102 and is stored in the data storage unit 204. The specification information stored in the data storage unit 204 includes a plurality of pieces of feature information storing the respective features of a plurality of observation targets so that the specification unit 202 can execute a search based on the features of the observed object 102. For example, the specification unit 202 can be trained in advance to execute a known specification program for facial detection, voice detection, and the like, and the specification unit 202 will specify the observed object 102, from the specification information stored in the data storage unit 204, based on pieces of feature information related to the face, the entire body, the voice, and the like.

In addition, the specification information stored in the data storage unit 204 can also include a plurality of pieces of observation object information associated with the plurality of pieces of feature information described above and store information related to a plurality of observation targets. The use of this observation object information will be described later.

In a case in which the specification unit 202 cannot specify the observed object 102 (NO in step S302), the information presentation system 100 will shift to the process of step S303. In step S303, a feature of the observed object 102 which could not be specified by the specification unit 202 will be added as new feature information of the observed object 102 by the data storage unit 204 to the feature information of the specification information.

A case (YES in step S302) in which the specification unit 202 has specified the observed object 102 by searching for the plurality of pieces of feature information stored in the data storage unit 204 will be described next. When the specification unit 202 has specified the observed object 102, the information presentation system 100 shifts to the process of step S304. In step S304, the display unit 205 displays, among the plurality of pieces of observation object information stored in the data storage unit 204, the observation object information of the observed object 102 specified by the specification unit 202. The display unit 205 may be a part of a region on the smart glasses. Also, for example, the display unit 205 may display the observation object information of the observed object 102 specified by the specification unit 202 on a screen of a tablet terminal such as a smartphone or the like. That is, display unit 205 may be a circuit that generates a signal for displaying the observation object information and the like by controlling a display device such as the screen of a tablet terminal or the like arranged outside the information presentation system 100. In this manner, components such as the obtainment unit 201, the specification unit 202, the data storage unit 204, the display unit 205, and the like may be integrally arranged or may be separated into a plurality of components and be arranged in the information presentation system 100.

The observation object information to be displayed by the display unit 205 can include, for example, a profile of the observed object 102, the number of times that the observed object 102 has been observed before (for example, a previous occasion), a date and a time at which the observed object 102 has been observed before (for example, the previous occasion), a state in which the observed object 102 has been observed before (for example, the previous occasion), contents of conversation with the observed object 102 which were held before (for example, the previous occasion), information of an accompanying person when the observed object 102 has been observed before (for example, the previous occasion), and the like. The profile of the observed object 102 can include, for example, the name, the affiliation such as a company in which the observed object works, a school in which the observed object studies, or the like, the title, the age, the hobbies, the preferences, the place of origin, and the like of the observed object 102.

When the display unit 205 has displayed the observation object information stored in the data storage unit 204, the information presentation system 100 will shift to the process of step S305. In step S305, the communication unit 209 starts the obtainment of related information of the observed object 102 specified by the specification unit 202. More specifically, the communication unit 209 accesses the server 203, which is present outside the information presentation system 100, to obtain the related information of the observed object 102 which is publicly available on the server 203. The related information can include the profile of the observed object 102, recent movements and developments of the observed object, and the like. More specifically, the related information may be, for example, the latest profile of the observed object 102 including information such as the affiliation, the title, the hobbies, the preferences, and the like described on an SNS (Social Networking Service), an official homepage, or the like. The related information may also be, for example, information of the recent movements and developments of the observed object 102 such as a visited location, the contents of an activity, and the like of the observed object described on an SNS, an official homepage, or the like. When the related information of the observed object 102 is obtained by the communication unit 209, the display unit 205 will display the related information of the observed object 102. That is, the information displayed by the display unit 205 includes the related information of the observed object 102 specified by the specification unit 202.

The flowchart shown in FIG. 3 shows that the communication unit 209 will obtain (step S305) the related information of the observed object 102 after the specification unit 202 has specified the observed object 102 (YES in step S302) and the display unit 205 has displayed the observation object information of the observed object 102 (step S304). However, the present disclosure is not limited to this, and it may be arranged so that the processes of steps S304 and S305 will be executed in parallel in a case in which the specification unit 202 has specified the observed object 102.

When the communication unit 209 has obtained the related information of the observed object 102, the information presentation system 100 will shift to the process of step S306. A case in which there is a difference between the related information and the observation object information of the observed object 102, specified by the specification unit 202, among the pieces of the observation object information stored in the data storage unit 204 can be considered in step S306. If there is a difference between the related information and the observation object information of the observed object 102, the data storage unit 204 will update, based on the related information obtained by the communication unit 209, the observation object information, which is stored in the data storage unit 204, of the observed object 102 specified by the specification unit 202. For example, regarding an item in which there is a difference between the observation object information and the related information obtained by the communication unit 209, the data storage unit 204 will expand the information related to the observed object 102 by automatically updating the observation object information with latest information and adding a new item if a new item is present. In case in which there is no difference between the related information and the observation object information of the observed object 102, the information presentation system 100 may shift to the process of step S307.

When the observation object information stored in the data storage unit 204 is updated, the information presentation system 100 will shift to the process of step S307. In step S307, the display unit 205 may display the observation object information of the observed object 102 that was updated in step S306. In addition, in a case in which there is no difference between the related information and the observation object information of the observed object 102 in step S306, the display unit 205 may continue to display the observation object information of the observed object 102 displayed in step S304. Furthermore, in step S307, after the meeting with the observed object 102 has ended, the data storage unit 204 may further update the observation object information, stored in the data storage unit 204, in relation to information about the date and the time of the meeting, the location of the meeting, the number of meetings, the summary of the contents of the conversation, and the like. These operations for updating information executed in the processes of steps S306 and S307 may also be executed automatically. Alternatively, for example, the display unit 205 may display the difference between the observation object information stored in the data storage unit 204 and the related information obtained by the communication unit 209, and the user 101 may select the contents to be updated among the pieces of observation object information of the observed object 102.

As described above, by managing the observation object information of the observed object 102 in the data storage unit 204 and displaying the observation object information on the display unit 205, personal information can be safely managed in a paperless manner. In addition, the communication unit 209 will communicate with the server 203 outside the information presentation system 100 to obtain the related information of the observed object 102 specified by the specification unit 202. As a result, the display unit 205 can display the latest related information obtained by the communication unit 209. In addition, the observation object information, of the observed object 102, which is stored in the data storage unit 204 and is to be displayed on the display unit 205 will be constantly updated with new information, thus allowing the accuracy of the information related to the observed object 102 to be improved.

Also, a case in which there is a difference between the feature information of the observed object 102 specified, among the plurality of pieces of feature information stored in the data storage unit 204, by the specification unit 202 and the feature information of the observed object 102 obtained by the obtainment unit 201 can be considered. This difference can be, for example, a change caused by the observed object 102 wearing glasses or the like, a change in the body shape or the vocal tone of the observed object 102, or the like. In such a case, the data storage unit 204 may update the stored feature information of the observed object 102 based on the feature of the observed object 102 obtained by the obtainment unit 201.

Furthermore, the data storage unit 204 may not only update the observed object 102, but also update and add, in addition to the specification information of the observed object 102, the specification information (feature information) of one or more persons or the like who accompanied the observed object 102 obtained by the obtainment unit 201. In addition, the display unit 205 may also display the observation object information of the specification information of these accompanying persons.

The data storage unit 204 may not be arranged in a wearable device such as smart glasses in a manner similar to the display unit 205 described above. For example, the data storage unit 204 may be arranged on a server communicable by the communication unit 209.

In addition, in step S303 when the data storage unit 204 is to add, as a new piece of feature information of the observed object 102, a feature of the observed object 102 which could not be specified by the specification unit 202, the communication unit 209 may obtain information related to the observed object 102 from the external server 203. For example, regarding a feature such as the face or the like of the observed object 102 which could not be specified by the specification unit 202, the communication unit 209 may obtain the related information of the observed object 102 based on the feature of the observed object 102 obtained by the obtainment unit 201. In this case, the information presentation system 100 may further include a search unit that uses a feature of the observed object 102 to search for information related to the observed object 102 in the external server 203, or the specification unit 202 or the data storage unit 204 may have a search function. The information related to the observed object 102, which has been obtained by the communication unit 209 from the server 203 arranged outside the information presentation system 100, may be newly added as the observation object information of the observed object 102 by the data storage unit 204 by associating the obtained related information with a piece of feature information that has been added among the plurality of pieces of feature information. When the communication unit 209 has been able to obtain the information related to the observed object 102 which could not be specified by the specification unit 202, the display unit 205 may display this information. In addition, after a meeting with the observed object 102 who could not be specified by the specification unit 202 has ended, the information of the date and the time of the meeting, the location of the meeting, the number of meetings, the summary of the contents of the conversation, and the like may be further updated in the observation object information stored in the data storage unit 204. The user 101 may also use an input function of a tablet terminal to store, as the observation object information, the information related to the unspecified observed object 102 in the data storage unit 204.

Figure 4:
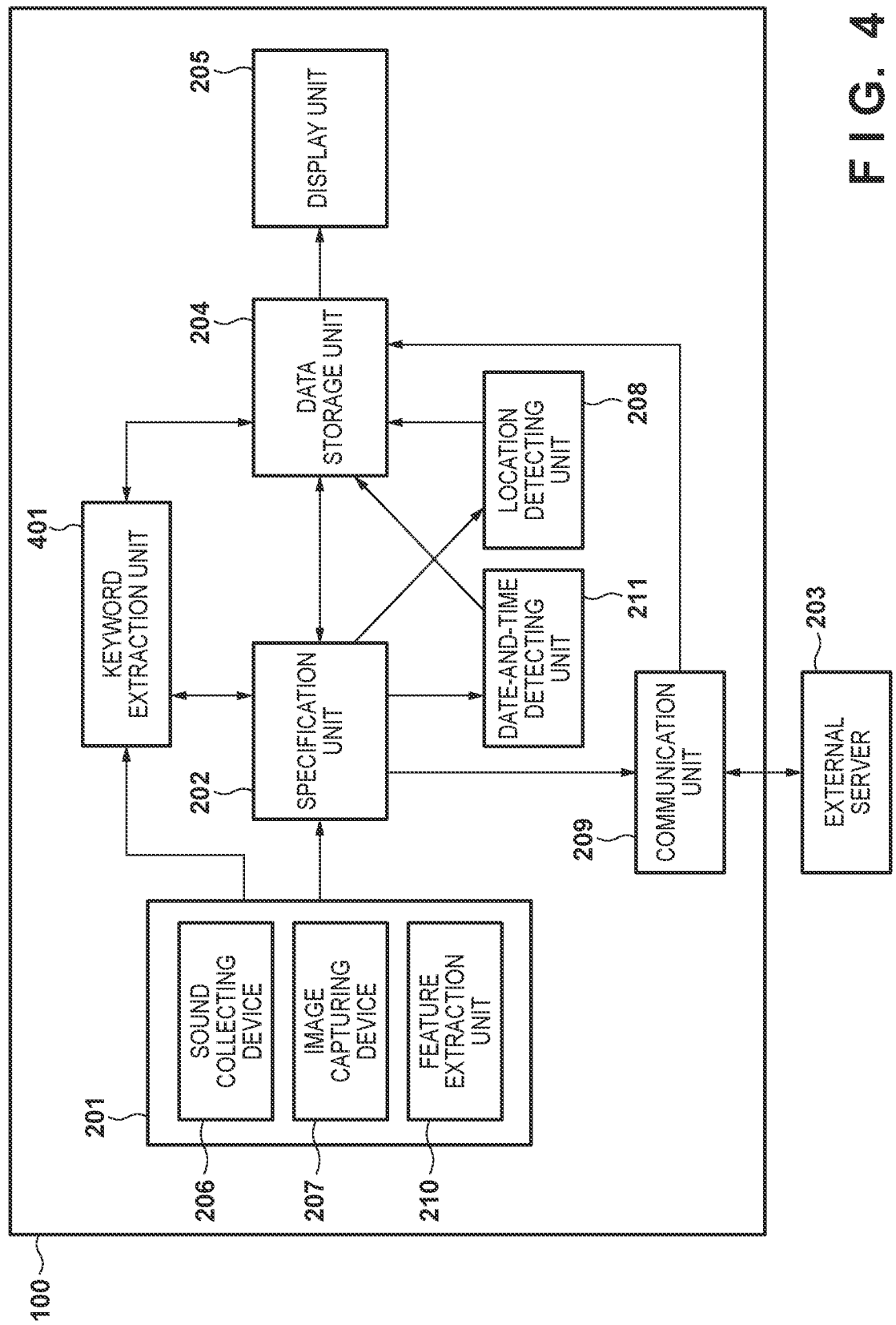
FIG. 4 is a block diagram showing another example of the arrangement of the information presentation system according to the embodiment.

FIG. 4 is a block diagram showing a modification of the example of the arrangement of the information presentation system 100 shown in FIG. 2. Compared to the arrangement shown in FIG. 2, the information presentation system 100 shown in FIG. 4 further includes a keyword extraction unit 401 for extracting keywords from sounds collected by the sound collecting device 206.

Figure 5:
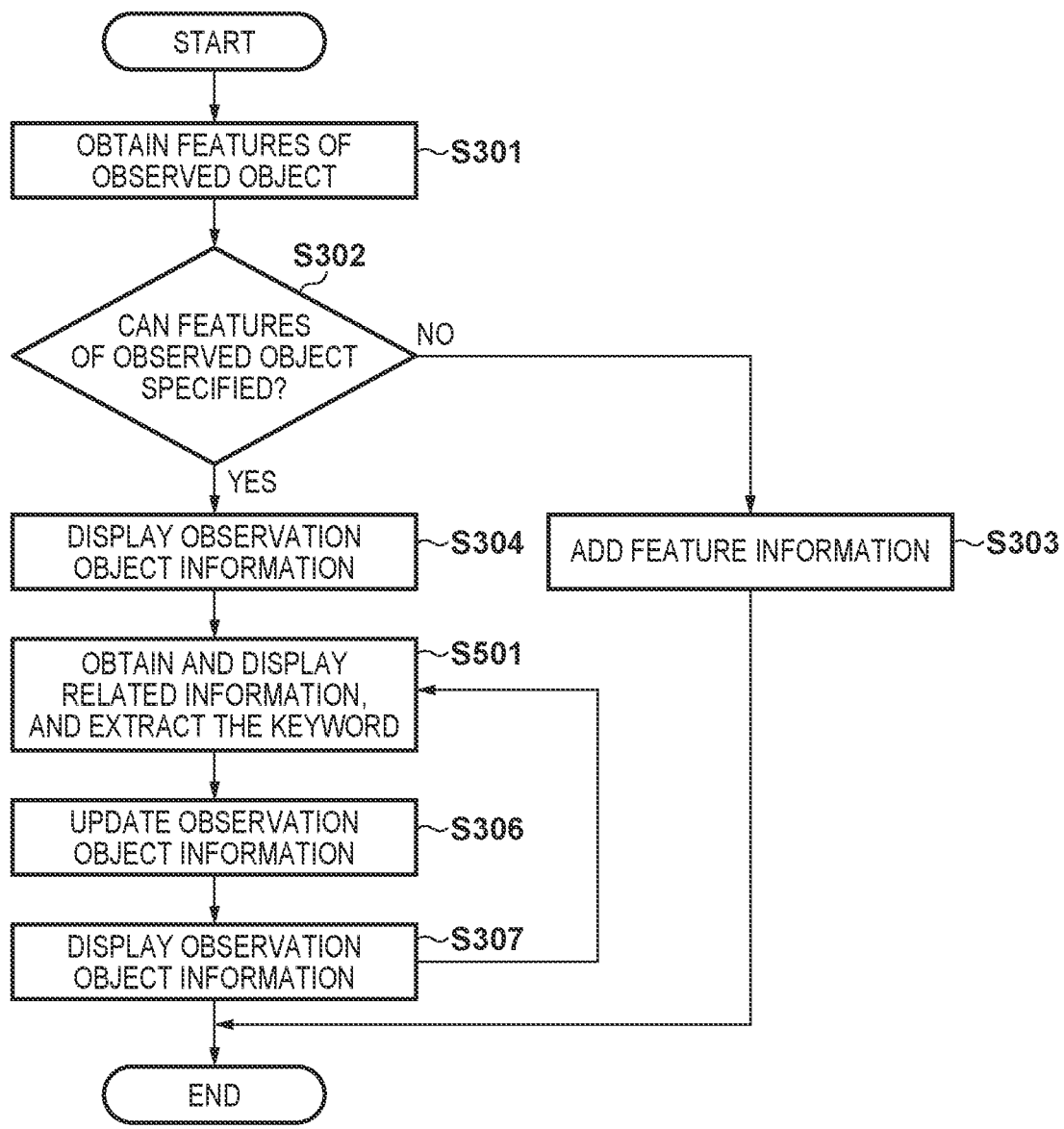
FIG. 5 is a flowchart showing the procedure of the signal processing of the information presentation system of FIG. 4.

FIG. 5 is a flowchart showing the procedure of the signal processing of the information presentation system 100 shown in FIG. 4. Since the processes up to step S304 may be similar to those described above with reference to FIG. 3, a description will be omitted. When the specification unit 202 has specified the observed object 102 (YES in step S302) and the display unit 205 displays the observation object information in step S304, the information presentation system 100 will shift to the process of step S501. In step S501, in a manner similar to the process of step S305, the communication unit 209 will access the server 203 which is present outside the information presentation system 100, and obtain the related information of the observed object 102 which is publicly available on the server 203. Together with the obtainment of the related information by the communication unit 209, the keyword extraction unit 401 will extract, for example, each keyword that appears a plurality of times in the conversation with the observed object 102. Related information of the observed object 102 including a summary of the contents of the conversation will be obtained from the extracted keyword. As described above, the processes of steps S304 and S501 may also be executed in parallel.

After the obtainment of related information has been performed by the communication unit 209 and the keyword extraction unit 401, the information presentation system 100 will shift to the process of step S306 and shift subsequently to the process of step S307. In step S307, the display unit 205 displays the observation object information of the observed object 102 updated in step S306 based on the related information obtained by the communication unit 209 and the keyword extraction unit 401. In addition, for example, there may be a case in the summary of a past conversation related to a keyword extracted by the keyword extraction unit 401 is stored in the observation object information, of the observed object 102, stored in the data storage unit 204. In such a case, the display unit 205 may display the observation object information of the summary of the past conversation related to this keyword stored in the data storage unit 204. The keyword extraction by the keyword extraction unit 401 in step S501 may be performed repeatedly. The keyword extraction unit 401 can increase the accuracy of keyword extraction by sorting and selecting the extracted keywords by using, as supervisory data, the observation object information of the observed object 102 stored in the data storage unit 204. In this case, the supervisory data may include, among the pieces of the observation object information stored in the data storage unit 204, keywords from a past conversation and information such as hobbies, preferences, and the like. For example, if cooking is the hobby of the observed object 102, names of cuisines, cooking methods, cooking ingredients, and the like may be extracted as the keywords.

As described above, the keyword extraction unit 401 obtains, in real time, the related information of the observed object 102 from the contents of the conversation between the user 101 and the observed object 102. The observation object information of the observed object 102 stored in the data storage unit 204 is updated based on the related information obtained by the keyword extraction unit 401. As a result, the observation object information of the observed object 102 stored in the data storage unit 204 and to be displayed on the display unit 205 will be constantly updated with new information, thus allowing the accuracy of the information related to the observed object 102 to be improved.

FIG. 6 is a block diagram showing another modification of the example of the arrangement of the information presentation system 100 shown in FIG. 2. Compared to the arrangement shown in FIG. 2, the information presentation system 100 shown in FIG. 6 further includes a state detecting unit 601 that detects, from the features of the observed object 102 obtained by the obtainment unit 201, the state of the observed object 102 which includes at least one of the state of health and the state of tension of the observed object 102.

FIG. 7 is a flowchart showing the procedure of the signal processing related to the state detecting unit 601 of the information presentation system 100 shown in FIG. 6. The procedure of the signal processing shown in FIG. 7 can be executed in parallel to the above-described procedure of the signal processing shown in FIG. 3. When the obtainment unit 201 obtains the features of the observed object 102 in step S301, the information presentation system 100 will shift to the process of step S701. The state detecting unit 601 obtains, among the features of the observed object 102 obtained by the obtainment unit 201, features related to the state of the observed object 102 such as the facial color, the eyeball movements, the degree of opening of each iris, the lip movements, the movement information of hands and feet, the perspiration, the fever, the vocal tone, and the like. The obtainment unit 201 may also include not only the sound collecting device 206 and the image capturing device 207, but also a heat source detecting sensor 602, such as a thermographic sensor, for obtaining temperature information including the perspiration information and the fever information of the observed object 102 as the features of the observed object 102. In this case, the state detecting unit 601 can detect the state of the observed object 102 from the temperature information of the observed object 102.

Next, the state detecting unit 601 will detect, based on the obtained features related to the state of the observed object 102, states such as the state of health or the state of tension of the observed object 102. The state detecting unit 601 will be trained in biological information such as the features concerning the states of humans, animals, and the like in advance. As a result, the state detecting unit 601 can extract feature amounts from the obtained movements related to the state of the observed object 102 to detect the state, such as the state of health, the state of tension, or the like, of the observed object 102.

When the state detecting unit 601 has detected the state of the observed object 102, the information presentation system 100 will shift to the process of step S702. In step S702, based on the detected information of states such as the state of health, the state of tension, and the like of the observed object 102, the state detecting unit 601 will update the information related to the features concerning the states of humans, animals, and the like included in the state detecting unit 601.

When the state detecting unit 601 has updated the information related to the features concerning the states of humans, animals, and the like, the information presentation system 100 will shift to the process of step S703. In step S703, the display unit 205 will display the results, such as the state of health, the state of tension, and the like of the observed object 102, detected by the state detecting unit 601.

As described above, by causing the display unit 205 to display the state of the observed object 102 such as the state of health, the state of tension, or the like of the observed object 102 detected by the state detecting unit 601, it will be possible to support the communication between the user 101 and the observed object 102.

Here, the observed object 102 may not only be a human (person), but also an animal or the like. For example, the state detecting unit 601 can be trained in the relationships between the states of an animal and the expressions, the cries (vocal tones), the movements, and the like of the animal. This will allow the state detecting unit 601 to detect not only the state of a person, but also the state of health, the state of tension, or the like of an animal. For example, the state detecting unit 601 may detect that an animal is tense and is in a threatening state from the cries and movements of the animal, and cause the display unit 205 to display that the animal is "dangerous". Also, for example, the state detecting unit 601 may also detect that an animal is friendly and is in a state seeking affection from the cries and movements of the animal, and cause the display unit 205 to display that it is "Okay to get close" to this animal. In this manner, it will be possible to support the communication between the user 101 and the observed object 102 even in a case in which the observed object 102 is an animal.

In the arrangement shown in FIG. 6, the state detecting unit 601 has been added to the arrangement shown in FIG. 2 as described above. However, the present disclosure is not limited to this, and the keyword extraction unit 401 described above may also be added. In such a case, the procedure of the signal processing shown in FIG. 7 can be executed in parallel to the procedure of the signal processing shown in FIG. 5 described above. In addition, in the arrangement shown in FIG. 6, the state detecting unit 601 which detects the state of the observed object 102 from information obtained by the sound collecting device 206, the image capturing device 207, and the heat source detecting sensor 602 is shown to have an arrangement independent of the obtainment unit 201 and the like. However, the present disclosure is not limited to this, and for example, the state detecting unit 601 may be included in the feature extraction unit 210 that extracts the features of the observed object 102 from the information obtained by the sound collecting device 206 and the image capturing device 207.

A case in which the observed object 102 is mainly a human (person) has been described. However, an observation target to be the observed object 102 as described above may also be a building structure such as a building, a train station, or the like, an animal, natural scenery, or the like. FIG. 8 is a view showing a state in which the information presentation system 100 according to this embodiment is in use. As shown in FIG. 8, an observed object 102a to be an observation target may be a building structure such as a building, a train station, a bridge, a shrine, a temple, or the like, an animal (organism) such as a mammal, a reptile, a bird, an amphibian, a fish, a shellfish, an insect, or the like, or natural scenery such as a mountain, a river, or the like. In addition, for example, an observed object 102b to be an observation target may also be a building structure, an animal, natural scenery, or the like as image information such as video or a photograph that appears on a screen of a television, a personal computer, or a tablet terminal such as a smartphone.

The procedure of the signal processing of the information presentation system 100 in a case in which an observation target other than a person is set as the observed object 102 will be described next. The signal processing of the information presentation system 100 in a case in which a building structure, an animal, natural scenery, or the like is to be the observed object 102 can be basically similar to the procedure of the flowchart shown in FIG. 3 described above. Hence, in this case, parts that have changed from those described above in FIG. 3 due to the fact that the observed object 102 is not a person, but a building structure, an animal, or natural scenery will be described, and a description of parts similar to the above-described signal processing will be omitted appropriately.

In step S301, the obtainment unit 201 obtains the features of the observed object 102. If the observed object 102 is a building structure or natural scenery, the obtainment unit 201 can obtain, in step S301, the features of the observed object 102 from information such as an image or the like obtained by using the image capturing device 207. Alternatively, if the observed object 102 is an animal or the like, the obtainment unit 201 can obtain, in step S301, the features of the observed object 102 from the face and the entire body of the animal obtained by using the image capturing device 207 and the cries or the like of the animal obtained by the sound collecting device 206. When the obtainment unit 201 has obtained the features of the observed object 102, the information presentation system 100 will shift to the process of step S302.

In step S302, the specification unit 202 will specify the observed object 102 from the features of the observed object 102 obtained by the obtainment unit 201. In a manner similar to the case in which the observed object 102 is a person, the specification unit 202 will be trained in advance to execute a known specification program for shape detection, form detection, sound detection, and the like. The specification unit 202 can specify the observed object 102 from feature information, such as the shape of a building structure, the form and the cry of an animal, or the like, among the pieces of specification information stored in the data storage unit 204.

In a case in which the specification unit 202 cannot specify the observed object 102 (NO in step S302), the information presentation system 100 will shift to the process of step S303. In step S303, the data storage unit 204 will add, as new feature information of the observed object 102 to the feature information of the specification information, a feature of the observed object 102 which could not be specified by the specification unit 202.

When the specification unit 202 has specified the observed object 102, the information presentation system 100 will shift to the process of step S304. In step S304, the display unit 205 will display, among the plurality of pieces of the observation object information stored in the data storage unit 204, the observation object information of the observed object 102 specified by the specification unit 202.

For example, if the observed object 102 is a building structure, the observation object information stored in the data storage unit 204 can include a profile of the observed object 102 such as the name of the building structure, the location, and the like. Also, if the observed object 102 is a building structure, the observation object information can include, for example, the number of times the user has visited the building structure (the number of times the observed object 102 has been observed), the time when the user has visited the building structure (the date and the time at which the observed object 102 has been observed), the direction and the distance from the current location detected by the location detecting unit 208 (the state in which the observed object 102 has been observed), the accompanying person(s) at the time of the visit, the contents of the conversation during this visit, and the like. Alternatively, for example, if the observed object 102 is an animal, the observation object information stored in the data storage unit 204 can include a profile of the observed object 102 such as the name of the animal, the main habitat, and the like.

When the display unit 205 has displayed the observation object information stored in the data storage unit 204, the information presentation system 100 will shift to the process of step S305. In step S305, the communication unit 209 will start obtaining the related information of the observed object 102 specified by the specification unit 202. More specifically, the communication unit 209 will access the server 203, which is present outside the information presentation system 100, to obtain the related information of the observed object 102 which is publicly available on the server 203.

When the communication unit 209 has obtained the related information of the observed object 102, the information presentation system 100 will shift to the process of step S306. Here, a case in which there is a difference between the related information and the observation object information of the observed object 102, specified by the specification unit 202, among the pieces of the observation object information stored in the data storage unit 204 will be described in step S306. In a case in which there is a difference between the related information and the observation object information of the observed object 102, the data storage unit 204 will update, based on the related information obtained by the communication unit 209, the observation object information of the observed object 102 specified by the specification unit 202. For each item in which there is a difference between the observation object information and the related information obtained by the communication unit 209, the data storage unit 204 will update the observation object information with the latest information and will add a new item as needed to expand the information about the observed object 102.

For example, if the observed object 102 is a building structure or the like, the related information obtained by the communication unit 209 can be information indicating that the building structured has been renovated, burned down by a fire, collapsed due to an earthquake, or the like since the user 101 has previously visited the observed object 102. In addition, for example, if the observed object 102 is a building structure or the like, the related information can be information indicating that the building structure has currently moved to another location from the location detected by the location detecting unit 208. Also, for example, if the observed object 102 is an animal in a zoo, an aquarium, or the like, the related information can be, for example, information indicating the degree of growth of the observed object 102 since the user 101 had previously observed the observed object 102, information indicating the birth of a child to this animal, information indicating that some of these animals were moved to another facility, and the like. The observation object information of the observed object 102 specified by the specification unit 202 is updated based on such related information obtained by the communication unit 209.

When the observation object information stored in the data storage unit 204 is updated, the information presentation system 100 will shift to the process of step S307. In step S307, the display unit 205 may display the observation object information of the observed object 102 updated in step S306.

As described above, even if the observation target is a target other than a human (person), the information presentation system 100 according to this embodiment can cause the communication unit 209 to communicate with the server 203 outside of the information presentation system 100 to obtain the related information of the observed object 102 specified by the specification unit 202. As a result, the display unit 205 can display the latest related information obtained by the communication unit 209. In addition, the observation object information of the observed object 102 which is stored in the data storage unit 204 and is to be displayed by the display unit 205 will be constantly updated with new information, and it will be possible to improve the accuracy of the information related to the observed object 102.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-152292, filed Sep. 10, 2020 which is hereby incorporated by reference herein in its entirety.

What is claimed is:

1. An information presentation system comprising:
an obtainment unit configured to obtain a feature of an observed object;
a specification unit configured to specify the observed object from the feature of the observed object obtained by the obtainment unit;
a display unit configured to display information of the observed object specified by the specification unit; and
a data storage unit configured to store specification information used by the specification unit to specify the observed object,
wherein the specification unit specifies the observed object by searching for the specification information based on the feature of the observed object,
the specification information includes a plurality of pieces of feature information storing respective features of a plurality of observation targets and a plurality of pieces of observation object information which are associated with the plurality of pieces of feature information and store information related to the plurality of observation targets which are used the specification unit to execute a search based on the feature of the observed object,
the information presentation system further includes a communication unit configured to communicate with a server arranged outside the information presentation system to obtain related information of the observed object specified by the specification unit,
the information displayed by the display unit includes the related information,
in a case in which the specification unit has specified the observed object and there is a difference between the related information and the observation object information of the observed object specified, among the plurality of pieces of observation object information, by the specification unit, the observation object information of the observed object specified, among the plurality of pieces of observation object information, by the specification unit is updated based on the related information, and
in a case where the specification unit cannot specify the observed object, the feature of the observed object which is not specified by the specification unit is added as the feature information of the observed object to the plurality of pieces of feature information.

2. The system according to claim 1, wherein in a case where the specification unit has specified the observed object,
the display unit displays the observation object information of the observed object specified, among the plurality of pieces of observation object information, by the specification unit, and
the communication unit starts obtaining the related information.

3. The system according to claim 1, wherein in a case where the specification unit has specified the observed object and there is a difference between the feature of the observed object obtained by the obtainment unit and the feature information of the observed object specified by the specification unit among the plurality of pieces of feature information included in the specification information stored by the data storage unit, the feature information of the observed object specified by the specification unit, among the plurality of pieces of feature information, is updated based on the feature of the observed object.

4. The system according to claim 1, wherein in a case where the specification unit cannot specify the observed object, information related to the observed object obtained by communication unit from the server arranged outside the information presentation system is associated with the added feature information among the plurality of pieces of feature information, and is added to the plurality of pieces of observation object information.

5. The system according to claim 1, wherein the obtainment unit includes a sound collecting device configured to obtain the feature of the observed object,
the information presentation system further includes a keyword extraction unit configured to extract a keyword from a sound collected by the sound collecting device, and
the related information includes the keyword extracted by the keyword extraction unit.

6. The system according to claim 5, wherein the obtainment unit further includes an image capturing device configured to obtain the feature of the observed object.

7. The system according to claim 1, further comprising:
a date-and-time detecting unit configured to obtain a date and a time when the observed object is observed, and
information of the date and the time is added to the observation object information of the observed object among the plurality of pieces of the observation object information.

8. The system according to claim 1, further comprising:
a location detecting unit configured to obtain a location where the observed object is observed, and
information of the location is added to the observation object information of the observed object among the plurality of pieces of the observation object information.

9. The system according to claim 1, wherein each of the plurality of pieces of observation object information includes one or more of each of a profile of the observed object, the number of times the observed object has been observed, a date and a time when the observed object has been observed, a location where the observed object has been observed, a state in which the observed object has been observed, contents of a conversation with the observed object if the observed object is a human, and information of an accompanying person when the observed object has been observed.

10. The system according to claim 1, wherein the obtainment unit includes one or more each of an image capturing device and an sound collecting device each configured to obtain the feature of the observed object.

11. The system according to claim 1, wherein the observed object is one of a human and an animal, and
the information presentation system further includes a state detecting unit configured to detect, from the feature of the observed object, a state of the observed object including at least one of a state of health and a state of tension of the observed object.

12. The system according to claim 11, wherein the obtainment unit further includes a heat source detecting sensor configured to obtain, as the feature of the observed object, temperature information including perspiration information and fever information of the observed object, and
the state detecting unit detects the state of the observed object from the temperature information of the observed object.

13. The system according to claim 1, wherein the related information includes at least one of a profile of the observed object and a movement of the observed object.

14. The system according to claim 1, wherein at least a part of the information presentation system is incorporated in a wearable device.

15. A control method of an information presentation system, comprising:
obtaining a feature of an observed object;
specifying the observed object from the obtained feature of the observed object;
causing a display unit to display information of the specified observed object; and
communicating with a server arranged outside the information presentation system and obtaining related information of the specified observed object,
wherein the information displayed by the display unit includes the related information,
the specifying includes searching for, based on the feature of the observed object, specification information which is used to specify the observed object and is stored in a data storage unit, and
the specification information includes a plurality of pieces of feature information which store respective features of a plurality of observation targets and a plurality of pieces of observation object information which are associated with the plurality of pieces of feature information and store information related to the plurality of observation targets which are used to execute a search based on the feature of the observed object,
in a case in which the observed object has been specified and there is a difference between the related information and the observation object information of the specified observed object among the plurality of pieces of observation object information, updating, based on the related information, the observation object information of the specified observed object among the plurality of pieces of observation object information, and
in a case where the observed object cannot be specified, the feature of the observed object which is not specified is added as the feature information of the observed object to the plurality of pieces of feature information.

16. A non-transitory computer-readable storage medium storing a program for causing a computer to execute a control method of an information presentation system, comprising:
obtaining a feature of an observed object;
specifying the observed object from the obtained feature of the observed object;

causing a display unit to display information of the specified observed object; and communicating with a server arranged outside the information presentation system and obtaining related information of the specified observed object, wherein the information displayed by the display unit includes the related information, the specifying includes searching for, based on the feature of the observed object, specification information which is used to specify the observed object and is stored in a data storage unit, and the specification information includes a plurality of pieces of feature information which store respective features of a plurality of observation targets and a plurality of pieces of observation object information which are associated with the plurality of pieces of feature information and store information related to the plurality of observation targets which are used to execute a search based on the feature of the observed object, in a case in which the observed object has been specified and there is a difference between the related information and the observation object information of the specified observed object among the plurality of pieces of observation object information, updating, based on the related information, the observation object information of the specified observed object among the plurality of pieces of observation object information, and in a case where the observed object cannot be specified, the feature of the observed object which is not specified is added as the feature information of the observed object to the plurality of pieces of feature information.

\* \* \* \* \*